United States Patent [19]

Petrone

[11] 4,064,912

[45] Dec. 27, 1977

[54] GAS MAIN STOPPER

[76] Inventor: Joseph A. Petrone, 14 Edith St., Old Tappan, N.J. 07675

[21] Appl. No.: 628,984

[22] Filed: Nov. 5, 1975

[51] Int. Cl.$^2$ .................. F16L 55/10; F16L 55/12
[52] U.S. Cl. .................................... 138/94; 138/89
[58] Field of Search ............... 138/89, 94, 97; 137/315, 317, 319, 320, 322

[56] References Cited

U.S. PATENT DOCUMENTS

| | | | |
|---|---|---|---|
| 1,833,700 | 11/1931 | Wolf | 138/94 X |
| 1,988,077 | 1/1935 | Goodman | 138/94 |
| 2,002,383 | 5/1935 | Witt | 138/94 X |
| 2,285,779 | 6/1942 | Mueller et al. | 138/94 |
| 2,425,483 | 8/1947 | Mueller et al. | 138/94 X |
| 2,482,696 | 9/1949 | Smith et al. | 138/94 |
| 2,696,966 | 12/1954 | Mueller et al. | 138/94 X |
| 2,780,244 | 2/1957 | Lee | 138/94 |
| 3,105,521 | 10/1963 | Edwards | 138/94 X |
| 3,275,023 | 9/1966 | Raspante | 138/94 X |
| 3,442,295 | 5/1969 | Ver Nooy | 138/94 |
| 3,774,647 | 11/1973 | Saha et al. | 138/94 |
| 3,842,864 | 10/1974 | Riegel et al. | 138/94 X |
| 3,905,396 | 9/1975 | Peterson | 138/97 |

*Primary Examiner*—Richard E. Aegerter
*Assistant Examiner*—James E. Bryant, III
*Attorney, Agent, or Firm*—John J. Hart

[57] ABSTRACT

The stopper includes a tubular cylindrical housing which seats on a gas main portion provided with a tap hole. A slidable tubular rod extends into the housing through the other end of the latter, and has connected to its lower end by a pivotal link, a stopper body in contracted condition for introduction into the gas main through the tap hole and being expansible within the main to stop the flow of gas therethrough. A packing gland assembly is provided on the other end of the cylindrical housing and is constructed to form a gas-tight closure for such housing, a gas tight slide guide for the tubular rod, and vent holes for the escape of gas from within the housing and into a venting pipe when the stopper additionally functions as a vent pipe. Normally however, the vent holes are closed by gas-tight plugs. A solid rod extends into the tubular rod through the outer end of the latter and is connected at its bottom end to the stopper body for expansion of the same by a cable which extends from such solid rod, around a guide pin located in the tubular rod, out through an aperture in such tubular rod and to a lug located on the stopper body diametrically opposite to the place of connection of the pivotal link to such a body. A second packing gland assembly forms a gas-tight closure at the outer end of the tubular rod and a gas-tight slide guide for the solid rod. The outer ends of the tubular and solid rods are provided with handles for manipulating the same and means are provided to temporarily secure the tubular rod to the cylindrical housing and the solid rod to the tubular rod. The vent pipe which has a diameter approximating that of the cylindrical housing and is aligned therewith when assembled thereon, is coupled to the upper end of the latter by a gas-tight compression coupling which encloses the first mentioned packing gland assembly.

1 Claim, 4 Drawing Figures

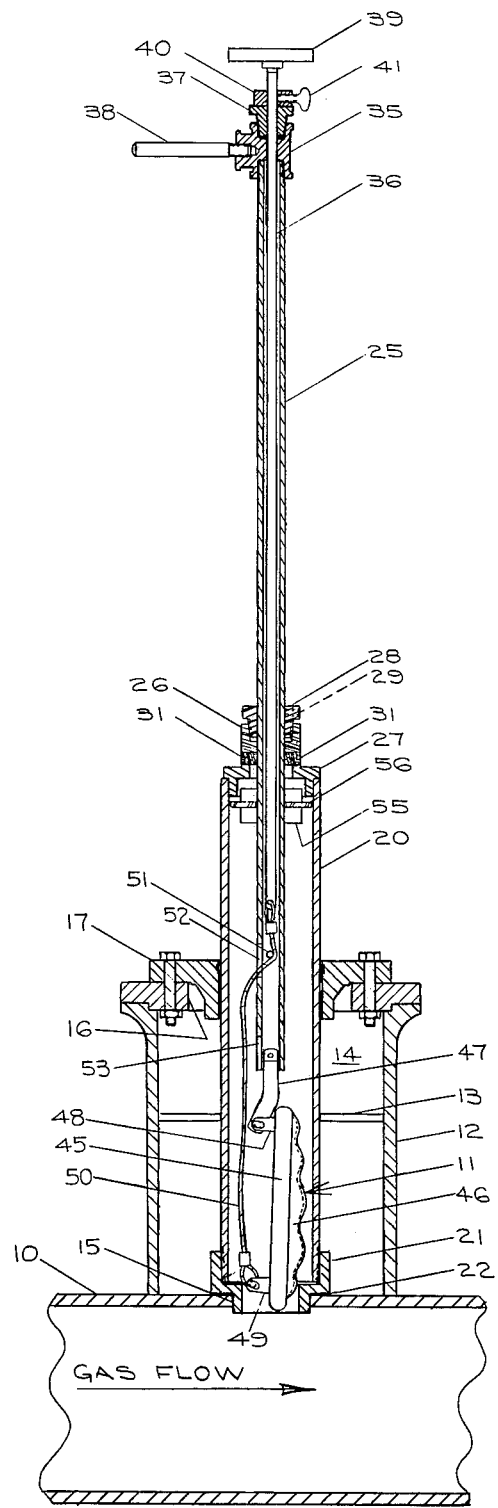

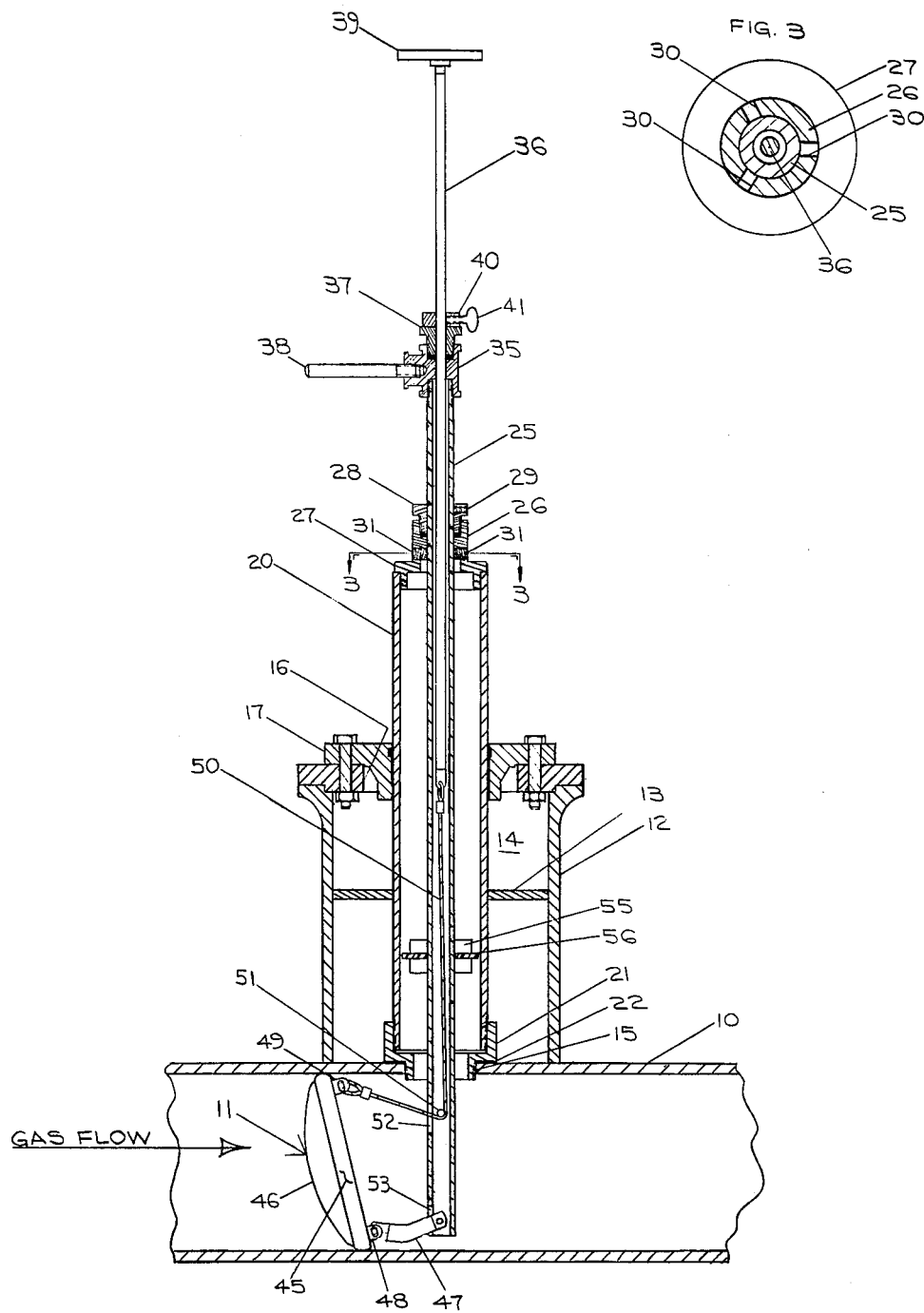
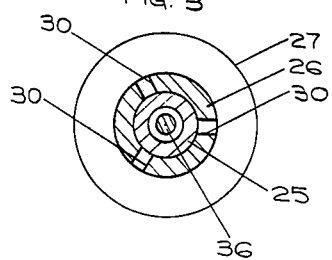

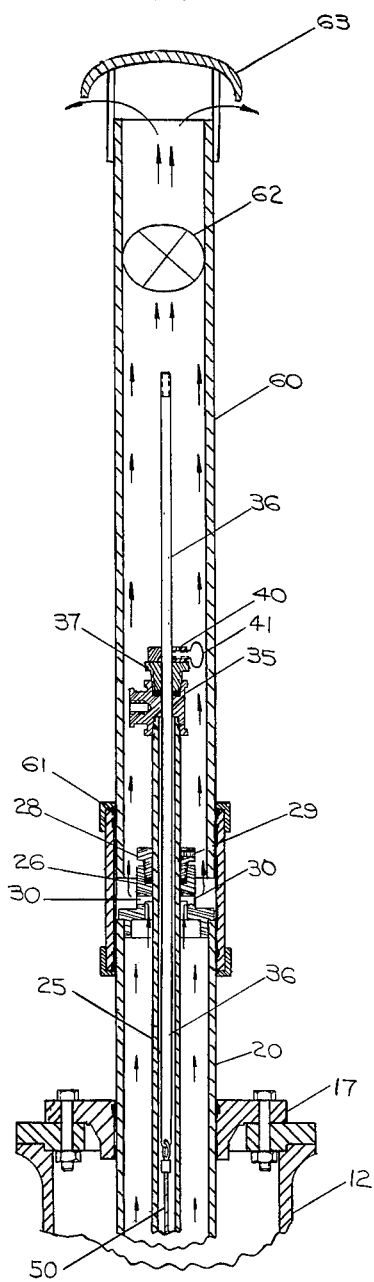

GAS MAIN STOPPER

THE INVENTION

This invention relates to gas main stoppers of the type that include an expansible stopper body which in a contracted condition is insertable through a tap hole in a gas main and then expanded in the main to cut-off the flow of gas.

The invention has for its primary purpose the provision of improved means for handling and manipulating the stopper body to effect its insertion and emplacement in the gas main and its withdrawal therefrom without the leakage or waste of gas.

Another object of the invention is to provide an improved stopper handling and manipulating means which enables the passing of the stopper body through the tap hole made in the gas main without danger of damage to such stopper body.

A further object of the invention is to provide an improved stopper handling and manipulating means that can readily be converted into a vent pipe without disturbing the gas blocking condition of the stopper body in the gas main.

Other objects of the invention as well as the advantages and features of novelty thereof will appear from a consideration of the following description, when read in connection with the accompanying drawings, in which FIG. 1 is a vertical sectional view showing a stopper embodying the invention mounted on a gas main and illustrating the positions of the parts thereof prior to the insertion of the stopper body through a tap hole in the gas main.

FIG. 2 is a view similar to FIG. 1 and shows the positions of the parts after the stopper body has been located in the gas main to stop the flow of gas therethrough;

FIG. 3 is a horizontal sectional view taken along the line 3—3 of FIG. 2; and

FIG. 4 is a vertical sectional view showing the upper portion of the stopper in operative condition on a gas main and converted to use as a venting pipe.

In the drawings, the reference numeral 10 designates generally a gas main in which the gas normally flows in the direction of the arrow. If for any reason it is desired to stop such flow of the gas through the pipe or through a particular section thereof, a stopper or stoppers of the indicated type is employed. Thus, when a break occurs in a pipe section, it is customary, among other things, to make tap holes in the gas main on both sides of the break and so mount gas stoppers in such tap holes as to prevent the normal flow of gas toward such break, as shown in FIGS. 1 and 2, and to prevent the back flow of gas on the downstream side of such break. In the latter instance, the stopper body 11 shown in FIG. 2 will be directed in the opposite direction. There are commercially available a number of tapping and drilling machines capable of providing the required tap holes in the gas main. The type which is especially adaptable to the purposes of this invention includes a housing 12 which snugly seats on the gas main 10 and contains approximately midway of its height a circular gate valve 13 which when closed prevents substantial flow of gas from the main into the upper portion 14 of the housing chamber. The valve 13 has a circular valve opening through which the tapping and drilling machine is inserted when forming the desired tap hole 15 in the gas main. The tapping machine is introduced into the housing 12 through an opening 16 formed in the top of the latter and is coupled to the housing thereat by a gas-tight gland structure 17 which is bolted to the top of the housing as indicated. When the hole 15 has been tapped, the machine is lifted upwardly until the drilling end thereof is in the chamber portion 14 above the gate valve 13, the latter is closed, and then the machine is wholly removed from the housing. The stopper of this invention is then inserted through the opening in the gland structure 17 so that its bottom end is located in the chamber portion 14. The gate valve 13 is opened and the stopper advanced through the opening in such valve until it seats in the tapped hole 15 provided in the gas main. As a result of the construction of the housing 12 and the stopper the assembly of these parts is accomplished readily and very little gas is wasted during the removal of the tapping and drilling machine and the assembly of the stopper in the housing 12 in position to be operated to effect a stoppage of the flow of gas in the main 10.

As is shown in FIGS. 1 and 2 of the drawings, the stopper comprises a hollow inserting cylinder 20 having a length greater than the height of the housing 12 so that it projects above the top of the housing. The cylinder 20 extends through the opening in the gland structure 17 which forms a gas-tight joint between such cylinder and the top of the housing. The cylinder 20 has threadedly connected to the lower end thereof in gas-tight relation a tubular reducing coupling 21 whose lower reduced end is threadedly connected to the tap hole 15. A gas-tight connection between the cylinder 20 and the gas main 10 is assured by providing a gasket 22 on the shoulder formed between the reduced lower and enlarged upper portions of the reducing coupling 21.

Extending down into the inserting cylinder 20 is a hollow stopper inserting rod 25 of an exterior diameter substantially less than the interior diameter of the cylinder 20. The rod 25 has a length substantially greater than that of the cylinder 20 and such that when it is fully advanced through the cylinder so that its bottom end is adjacent to the bottom of the gas main 10, as shown in FIG. 2, the upper end of the rod 25 still projects a substantial distance above the upper end of the cylinder 20. The rod 25 is slidably connected in gas-tight relation to the upper end of the cylinder 20 by a packing gland composed of a tubular body 26 through which the rod 25 extends and having formed at its bottom end a flanged cap portion 27 seated in gas-tight relation on the upper end of cylinder 20. The gland body 26 is adjustably connected in gas-tight relation to the rod 25 by an annular packing gland nut 28 which is threadedly connected to a female thread provided in the wall of a recess formed in the upper end of the body 26. An annular gasket of suitable packing material is located in the bottom of such recess. When the rod 25 has been slidably adjusted to a desired position relative to the cylinder 20, it is securely locked in such position by a set screw 29 provided in the nut 28. The flanged cap portion 27 of the gland body is annularly-shaped and has an interior diameter greater than the exterior diameter of the rod 25. Communicating with the annular space formed by the cap portion 27 and the rod 25 are three circumferentially spaced venting holes 30 extending transversely through the gland body 26 adjacent to the cap portion 27. The holes 30 are normally closed by three removable gas-tight plugs 31 which are removed when the stopper is connected into a vent pipe in a manner to be hereinafter more fully explained to bring the interior of the cylinder 20 into communication with the atmosphere.

The hollow rod 25 is provided at its upper end with a packing gland composed of a tubular body 35 through which a solid stopper expanding rod 36 slidably extends into the hollow stopper inserting rod 25. The gland body 35 has formed at its lower end a threaded recess by which it is secured in gas-tight relation to the upper threaded end of the hollow rod 25. The gland body 35 has also formed at its upper end a threaded recess for receiving an annular packing gland nut 37 and an annular gasket of suitable packing material to provide a gas-tight juncture between the two rods 25, 36 while permitting the latter to slidably move relative to the rod 25. The gland body is provided intermediate its ends with a third threaded recess for detachably connecting thereto and hence to the hollow rod 25 a handle 38 for vertically actuating such rod. The solid rod 36 has detachably connected to its upper end a handle 39 for vertically actuating such rod relative to the hollow rod 25. The rod 25 may be supported in a given vertical position relative to the rod 25 by a locking collar 40 which is slidably mounted on the rod 36 and which is provided with a thumb screw 41 to secure the collar to the rod 36 and thereby enable the collar to support the latter when it is resting on the gland nut 37.

The solid stopper expanding rod 36 has a length approximating that of the hollow stopper inserting rod 25 and such that when it is in its fully advanced position with relation to the rod 25 its lower end will be spaced upwardly from the bottom end of the rod 25. The stopper body 11 is supported on the bottom end of the hollow stopper inserting rod 25, and its expansion within the gas main 10 is controlled by means supported and actuated by the solid rod 36. The stopper body for stopping the flow of gas within the main 10 may be of any type known to the art. By way of example, the stopper body 11 is shown to be of the type comprising a collapsible frame 45 and a diaphragm 46. Prior to the insertion of the stopper body 11 into the gas main it is stored in collapsed condition within the cylinder 20, as shown in FIG. 1 of the drawings. After the stopper body is inserted through the opening in the reducing coupling 21 and into the gas main the collapsible frame 45 is manipulated to the position shown in FIG. 2 and expanded to a substantially circular form so that the diaphragm 46 thereof will block the flow of gas in the main 10 in a direction toward the convex side of the diaphragm. The stopper frame 45 is connected to the lower end of the inserting rod 25 by a link 47 which depends from its pivotal connection with such rod, as viewed in FIG. 1, and is pivotally connected at its other lower end to a lug 48 provided on the frame 45. Connected to a second lug 49 on the frame 45 diametrically opposed to the lug 48 is one end of a cable 50 which is connected at its other end to the bottom end of the solid stopper expanding rod 36. It is to be noted in FIGS. 1 and 2 of the drawings, that spaced upwardly from the pivotal connection of the link 47 with the hollow rod 25 a distance less than the diameter of the frame 45 in its expanded condition, there is provided within such rod 25 a cable pivot guide 51 in the form of a transverse pin. The cable 50 extends down from the rod 36, around such guide pin 51 and out through a short vertical slot 52 in the wall of the hollow rod 25 to enable the cable to swing the frame 45 upwardly about its pivotal connection with the link 47. In order to enable the link 47 to pivot freely a second short vertical slot 53 is provided at the bottom end of the tubular rod 25.

It will be understood from the foregoing, that after the stopper of this invention has been assembled in the housing 12, with the reducing coupling 21 on the bottom end of the stopper insertion or housing cylinder 20 properly fitted in the tap hole 15 formed in the gas main 10, the parts of the stopper will be in the condition shown in FIG. 1 of the drawings. In this condition, it will be observed, the hollow inserting rod 25 is raised sufficiently with respect to the cylinder 20 so that the lower end of the frame 45 in its collapsed condition is approximately flush with the lower end of the reducing coupling 21. The upper limit of the range of movement of the rod 25 relative to the cylinder 20 may be controlled by an annular stop block 55 adjustably connected to the rod 25 and adapted to seat in the recess formed on the underside of the cap portion 27 of the gland body 26 and located within the upper portion of the cylinder 20. The block 55 is provided with an annular disc 56 which slidably engages the inner wall of the cylinder 20. Thus, the block 55 and its disc 56 function both as a stop for limiting the upward movements of the rod 25 and as a centering spacer to maintain the rod 25 axially aligned within the cylinder 20 during the vertical movements of such rod. In the condition of the parts shown in FIG. 1 the set screw 29 is maintaining the rod 25 in raised position and the locking collar secured to the solid expanding rod 36 is resting on the packing gland nut 37 to support the rod 36 within the hollow rod 25 in its fully advanced position within the latter.

To insert the stopper body 11 within the gas main 10, the set screw 29 is loosened and the handle 38 pushed downwardly. As the rod 35 moves downwardly under the force exerted on the handle 38, it will slide downwardly in the gland body 26 and nut 28 and push the stopper body 11 through the reducing coupling 21. In such movement of the stopper body, the coupling 21 both guides such body into the gas main and protects the destructible diaphragm 46 of the stopper body from any burrs that are formed on the edges of the trapped hole 15 by the drilling operation. While the operator is forcing the handle 39 down with one hand, he grips the handle 39 on the upper end of the rod 36 to restrain such rod from partaking of the downward movement of the rod 25. As a result, as the stopper body enters the main 10, the restraining force exerted thereon by the cable 50, will cause the frame 45 thereof to be swung from the position shown in FIG. 1 to the position shown in FIG. 2. During this movement of the stopper body, the upper end of the frame 45 comes into contact with and slides along the interior surface of the gas main and is caused to be gradually expanded to a substantially circular form. This movement of the stopper body continues until the frame 45 assumes a tilted position with its periphery in intimate contact with the interior wall of the gas main. In this condition the diaphragm will have assumed a stretched convex shape with its outer convex surface directed in opposed relation to the direction of the flow of the gas in the main. The thumb screw 41 on the collar 40 is then tightened to maintain the rod 36 in this withdrawn position and consequently through the cable 50, a position holding tension on the frame 45.

It is to be noted that during the aforesaid manipulation of the stopper of this invention any gas entering the cylinder housing 20 is prevented from escape therefrom during the movements of the hollow rod 25 relative thereto by the gas tight packing gland composed of the gland body 26 and the packing nut 28. Likewise any gas entering the hollow rod 25 is prevented from escape therefrom during the movements of the solid rod 36 relative thereto by the gas-tight packing gland composed of the gland body 35 and the packing nut 37. There is consequently no waste of the gas in the main 10 during the operation of the stopper. Since the stopper effectively seals the tap hole 15 against escape of gas therethrough, it can be left in connected position until after the break in the damaged pipe section has been repaired. During this period the handles 38 and 39 may be temporarily removed to prevent tampering with the stopper or to convert the stopper into a device capable of additionally functioning as a vent pipe. When the stopper is used as a vent pipe it is used in association with a second stopper of similar construction located between it and the break in the damaged pipe section. Thus, between the stopper bodies 11 of the two stoppers there is a pipe portion in which no gas is flowing but into which there may be a minor leakage of gas through the stopper body furthest from the break. In order to prevent as much as possible any gas reaching the men working at the break the leakage into such pipe portion is vented through the stopper furthest from the break. This is possible because the body of the stopper which is farthest from the break and which is mounted on a tap hole 15 is located between the stopper body 11 thereof and the stopper body of the second stopper body located downstream between such farthest stopper and the break, as will become apparent from a consideration of FIG. 2 of the drawings.

As will be understood from the showing of FIGS. 3 and 4 of the drawings, the conversion of the stopper to a stopper and venting device is readily accomplished by connecting to a stopper from which the handles 38 and 39 have been removed, a tubular cylinder or pipe 60 having a diameter similar to the housing pipe 20. The pipe 60 is vertically arranged in spaced relation to the upper end of the housing 20 so that it becomes in affect an extension of the latter to enclose the portions of the stopper projecting above the housing 20. Such enclosure is made complete by connecting the lower end of the pipe 60 to the upper end of the housing 20 by a standard, commercially available gas-tight compression coupling 61. The pipe 60 has provided within its interior above the stopper portions enclosed thereby a suitable known gas valve 62. Provided on the upper end of the pipe 60 is a known type of flame arrester 63. Prior to assembly of the pipe 60 and its associated parts onto the housing 20, the three gas-tight plugs 31 are removed from the packing gland body 26. Thus, when the pipe 60 is assembled on the housing 20, communication between the interiors of the housing 20 and the pipe 60 is afforded by the venting holes 30 from which the plugs 31 have been removed. Consequently, any gas from the portion of the main 10 on which this assembly is mounted will flow upwardly through the housing 20 and through the venting holes 30 into the pipe 60 from which the escape of the gas into the atmosphere will be controlled by the valve 62, all as is indicated by the arrows in FIG. 4 of the drawings.

While there has been illustrated in the drawings, and hereinabove described, preferred embodiments of the invention, it will be apparent to those skilled in the art that changes may made therein without departing from the spirit of the invention, or the scope of the appended claims.

I claim:

1. A gas main stopper including a tubular housing insertable into a valve housing for receiving a tapping machine and seatable in gas-tight condition at one end upon a portion of a gas main provided with an opening, a slidable tubular rod extending into said tubular housing through the other end of the tubular housing, a stopper body in contracted condition located in said tubular housing and connected to one end of and supported by said tubular rod for introduction into the main through said opening therein and expansible within the main to stop the flow the gas therethrough, first means at said other end of the tubular housing forming a gas-tight closure for said tubular housing and a gas-tight slide guide for said tubular rod, first actuating means connected to said tubular rod outside of said housing for slidably moving said tubular rod in said first means, second means extending into said tubular rod through the other end of such rod and connected to said stopper body, second actuating means connected to said second means outside of said tubular rod for expanding said stopper body, and third means at said other end of said tubular rod forming a gas-tight closure for said tubular rod and a gas-tight joint with said second means, said first actuating means being operable to slidably advance said tubular rod toward the seated end of said housing to transfer said stopper body from said tubular housing and into said main through the opening in the main, and said second actuating means being operable to retract said second means from said one end of the tubular rod to effect the expansion of said stopper body within the main, said first means being provided with a vent hole for the escape of gas from within said tubular housing and into a venting pipe, and a gas-tight plug normally closing the vent hole, a vent pipe mounted on said other end of said tubular housing and forming an outward extension of the latter, and a coupling enclosing said first means and the vent hole thereof and connecting the adjoining ends of said tubular housing and vent pipe together in gas-tight relation.

* * * * *